(12) United States Patent
Duncan et al.

(10) Patent No.: US 6,718,281 B2
(45) Date of Patent: Apr. 6, 2004

(54) APPARATUS AND METHOD FOR VOLUMETRIC DILATOMETRY

(75) Inventors: Paul G. Duncan, Vienna, VA (US); Sean Michael Christian, Woodbridge, VA (US); Kevin Anthony Shinpaugh, Blacksburg, VA (US); Herve Marand, Blacksburg, VA (US)

(73) Assignee: Virginia Polytechnic Institute & State University, Blacksburg, VA (US)

( * ) Notice: Subject to any disclaimer, the term of this patent is extended or adjusted under 35 U.S.C. 154(b) by 0 days.

(21) Appl. No.: 09/783,389

(22) Filed: Feb. 15, 2001

(65) Prior Publication Data

US 2003/0046024 A1 Mar. 6, 2003

Related U.S. Application Data

(60) Provisional application No. 60/182,546, filed on Feb. 15, 2000.

(51) Int. Cl.$^7$ .................................................. G01B 7/00
(52) U.S. Cl. ...................................................... 702/159
(58) Field of Search .............................. 702/159, 155; 349/158; 364/485; 356/45, 347, 479; 374/56, 43; 523/116; 426/2; 528/502

(56) References Cited

U.S. PATENT DOCUMENTS 5,644,373 A * 7/1997 Furushima et al. ......... 349/158
5,734,578 A * 3/1998 Oh .............................. 364/485
6,496,265 B1 * 12/2002 Duncan et al. ............. 356/479

FOREIGN PATENT DOCUMENTS

JP 405259101 A * 10/1993

* cited by examiner

Primary Examiner—John Barlow
Assistant Examiner—Tung S Lau
(74) Attorney, Agent, or Firm—Greenberg Traurig, LLP; Richard E. Kurtz, II (57) ABSTRACT

Disclosed is a novel apparatus and method for volumetric dilatometry. A volumetric dilatometer includes an optical displacement sensor and a means for using a gap measurement obtained from the displacement sensor application in an application which requires the measurement of absolute distance and/or displacement. A novel signal-processing algorithm for volumetric dilatometry is also disclosed. The signal-processing algorithm includes a step for recovering the phase information from a spectral signal by taking the Fourier transform of a spectral signal and deriving a sensor gap measurement from the phase information. A microtranslation stage is provided for automated positioning of the optical sensor and automated re-leveling in an out-of-range condition. A heat source is consists of a vertical tube furnace, such as those found in drywell technologies. Further disclosed is a novel sealed-cell design which consists of a mercury reservoir, a sample cell capable of locking onto the bottom of the mercury reservoir and an outer reservoir sleeve for sensor-to-cell alignment during sensor positioning.

10 Claims, 12 Drawing Sheets

Figure 9:
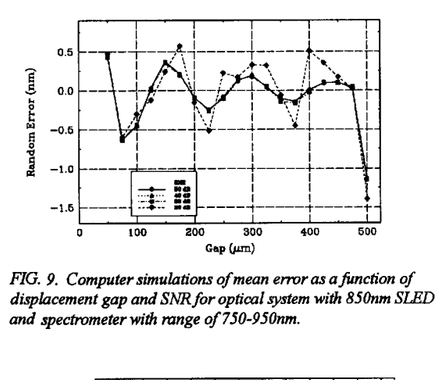

FIG. 9. Computer simulations of mean error as a function of displacement gap and SNR for optical system with 850nm SLED and spectrometer with range of 750-950nm.

Figure 10:
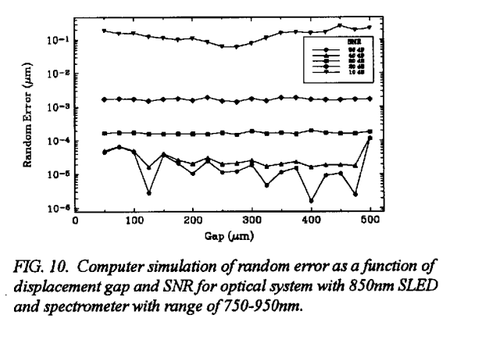

FIG. 10. Computer simulation of random error as a function of displacement gap and SNR for optical system with 850nm SLED and spectrometer with range of 750-950nm.

Figure 11:
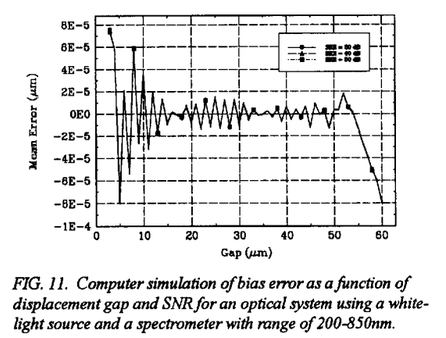

FIG. 11. Computer simulation of bias error as a function of displacement gap and SNR for an optical system using a white-light source and a spectrometer with range of 200-850nm.

Figure 12:
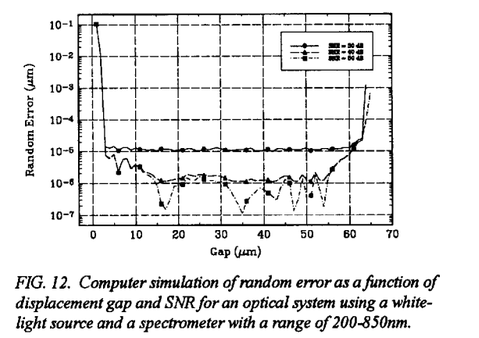

FIG. 12. Computer simulation of random error as a function of displacement gap and SNR for an optical system using a white-light source and a spectrometer with a range of 200-850nm.

APPARATUS AND METHOD FOR VOLUMETRIC DILATOMETRY

This Application claims the benefit of U.S. Provisional Patent Application No. 60/182,546 filed on Feb. 15, 2000, the entire disclosure of which is incorporated herein by reference.

BACKGROUND OF THE INVENTION

The ability to accurately characterize the thermal (T) and/or temporal (t) response of a material's specific volume ($V_{sp}$) is critical in materials engineering. This is due in part to a constant influx of new engineered materials to the market place (i.e. thermoplastics, thermosets, metal alloys, polymorphs of existing materials, thin films, nanocomposites, etc.) and the emergence and/or growth of new and exciting fields (i.e. microelectronics, composite manufacturing, etc.). Ultimately, this need is driven by the fact that there are a variety of physical phenomena that result in dimensional change (i.e. crystallization, melting, glass formation, secondary transitions and physical aging).

Although volumetric dilatometers have been in use for decades[1,2], at present, no commercially available device exists for the characterization of $V_{sp}(T,t)$ at ambient pressures that is capable of resolving the transitions alluded to above.

Devices which can be found within the marketplace that are capable of resolving changes of specific volume ($V_{sp}$) are as follows:

1. Density gradient columns[3],
2. Balance assemblies which allow for density characterization through buoyancy methods[4,5],
3. Mercury-in-Glass capillary dilatometers[6],
4. Linear dilatometers[7,8],
5. Mercury porosimeters[9,10],
6. Picnometers[9,10]
7. Cylinder-piston type dilatometers, and
8. Pressure-volume-temperature (pvT) devices[11,12].

Of these devices, only the latter four (5,6,7 and 8) are able to track volume as a function of both time and temperature and all suffer from limitations which include: 1) a narrow dynamic temperature range, 2) low sensitivity, 3) low accuracy, 4) toxicity concerns and/or 5) pressure requirements.

In recent years, many researchers have looked at supplanting traditional "linear" dilatometer sensor technology with optical technologies, yet to date, none have developed an optical technique for use with volumetric dilatometers. In fact, the only attempt toward advancement made in the field of volumetric dilatometry can be referenced in U.S. Pat. No. 5,172,977. This patent employs a capacitive technique for monitoring displacement of a mercury column. While capacitive sensor techniques have recently proven to be highly accurate methods for monitoring displacement in "linear" dilatometry[13], the applicability of capacitive sensor technology to volumetric dilatometry is questionable[14].

Figure 1:
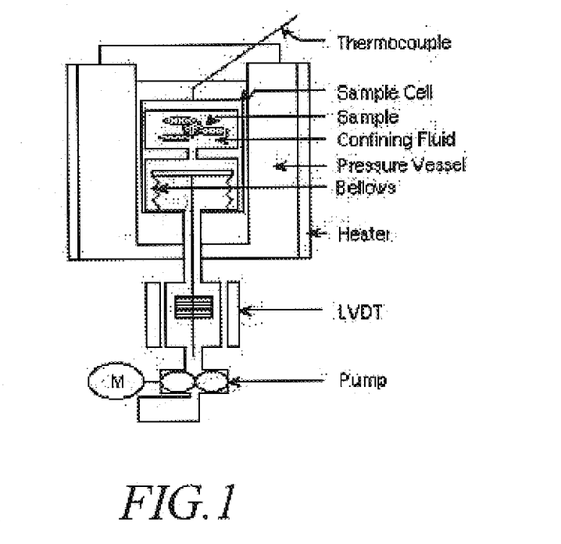

FIG. 1 illustrates the sensing principle behind current state-of-the-art for pvT apparatuses, such as the Gnomix device. The limitations associated with the device are 1) a minimum pressure requirement of 10 bar, 2) low sensitivity, and 3) large sample size requirements. These limitations are related to the load cell design, sensor technology and heat source.

13 M. Rotter, H. Muller, E. Gratz, M. Doerr, and M. Loewenhaupt, "Aminiture capacitance dilatometer for thermal expansion and magnetostriction", *Review of Scientific Instruments*, 69(7), 2142–2746, 1998.
14 G. J. F. Holman and C. A tenSeldam, "A critical evaluation of the thermophysical properties of mercury", *J. Phys, Chem. Ref Data*, 23(5), 807–827, 1994.

Figure 2:
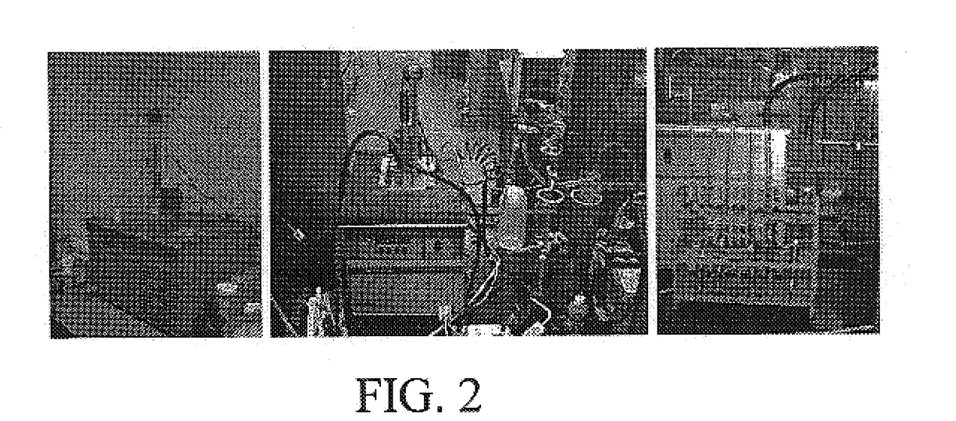

FIG. 2 shows photographs representative of prior art high resolution volumetric dilatometers. The left-hand photo shows a low temperature unit, the center photo shows a high temperature unit, and the right-hand photo shows multiple sample cells which have been constructed of low expansion glass. Note the counter balance systems and the linear voltage differential transducers (LVDT) used to measure displacement in the left and center photos. Both of these features can be shown to limit the ultimate resolution of the device. In addition, note that each glass cell differs in terms of its volume due to the fact that each cell must be manually sealed after loading. This also limits the ultimate sensitivity of the device due to calibration uncertainties associated with the initial cell volume.

Figure 3:
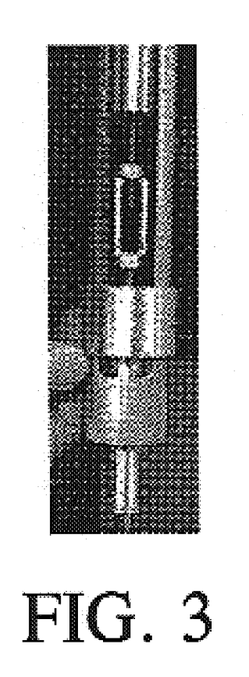

FIG. 3 shows the thermal breakers necessary to limit thermal transfer from the heat source to the sensor (LVDT). One breaker is between the lower (invar) portion of the push rod and the upper non-ferrous portion of the push rod. The other breaker is the outer device which houses the LVDT.

Figure 4:
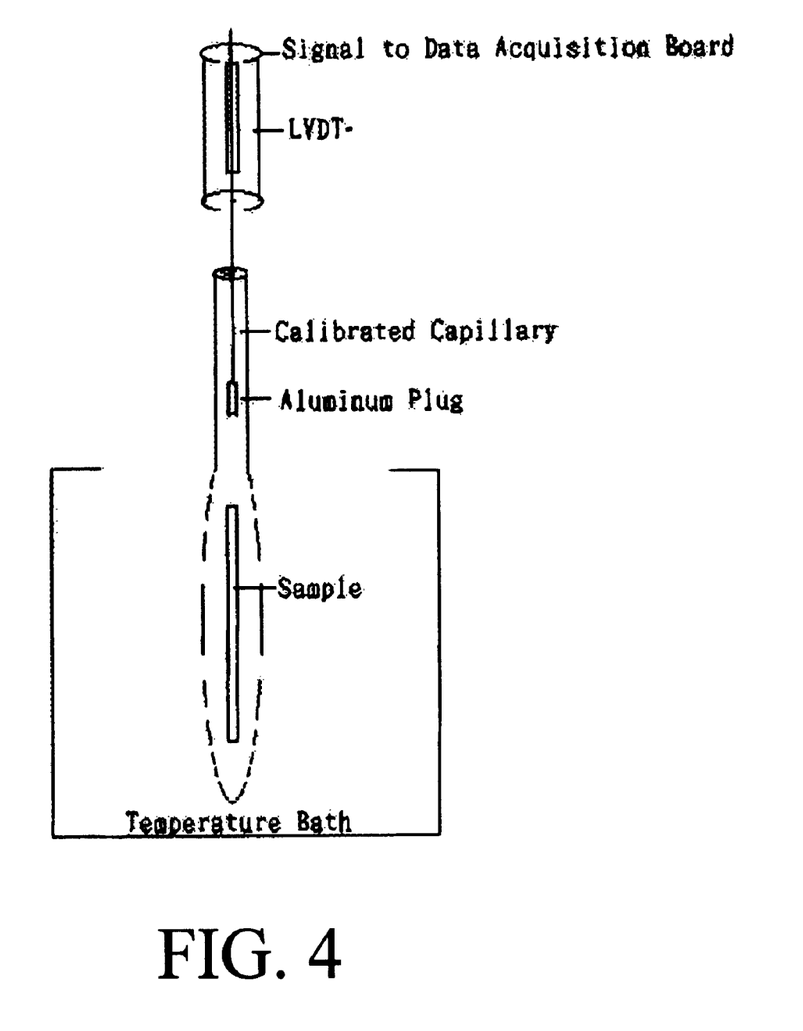

FIG. 4 shows the current state-of-the-art configuration for volumetric dilatometers. Shown are the LVDT, the push-rod, the calibrated capillary, the float (aluminum plug) and the heat source.

Figure 5:
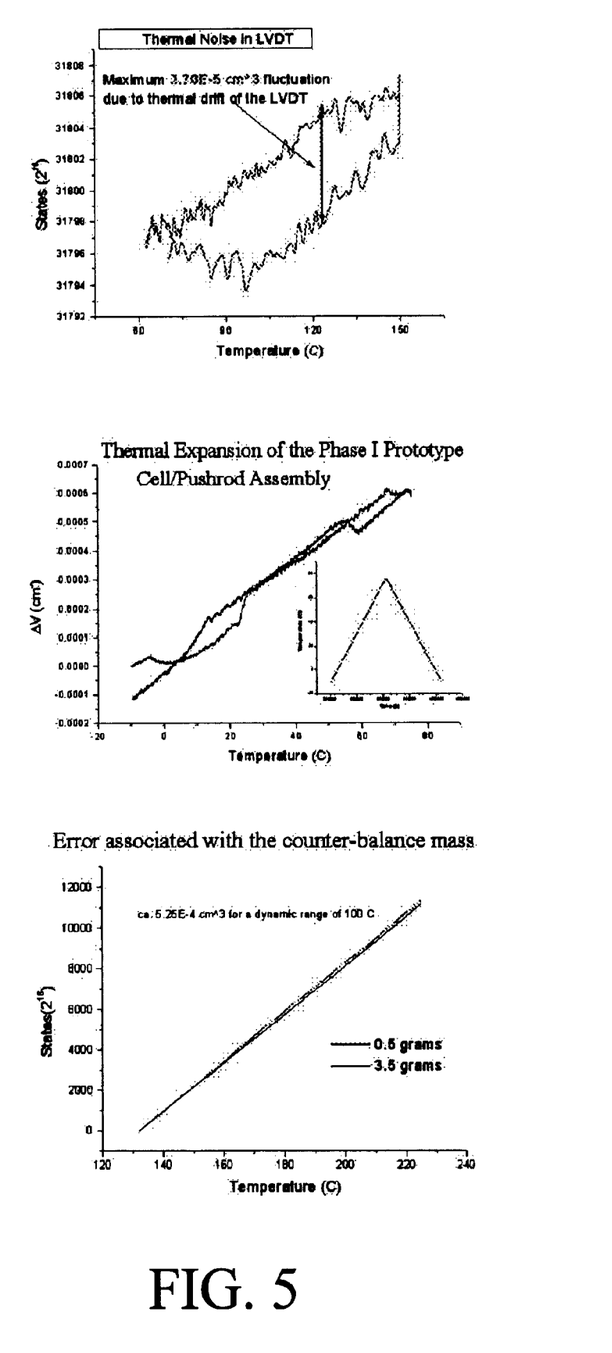

Generally, there have been four limiting factors associated with volumetric dilatometry. These limitations are derived from: 1) the sensor technology, 2) the cell design, 3) the measurement methodologies, and/or 4) the thermal control strategies employed. FIG. 5 details the limiting factors associated with conventional volumetric dilatometry: the thermal noise of the detector, the error associated with the push rod assembly (most likely attributed to buoyancy issues), and the error associated with changing the counter-balance mass. Note that the counter-balance mass changes with each experiment.

SUMMARY OF THE INVENTION

The invention in its preferred embodiment addresses the above and other limitations associated with the prior art. In a first aspect, the invention includes a dilatometer which utilizes a novel fiber optic sensor technology along with associated electro-optic subsystems which utilize a novel signal-processing algorithm. In a second aspect, the invention provides a novel sealed cell design. In a third aspect, the invention provides a novel heat source technology.

The volumetric dilatometer of the invention according to a preferred embodiment provides:

A sensitivity which exceeds 2.5 E-6 $cm^3$, accuracy which exceeds 2.5 E-5 $cm^3$, A dynamic temperature range of 300C or greater, Temperature control to within +/−0.005 C, and A reusable, sealed cell design that allows for ease of operation and reduced environmental concerns associated with traditional mercury-in-glass capillary dilatometers (i.e. mercury toxicity).

DETAILED DESCRIPTION

Figure 6:
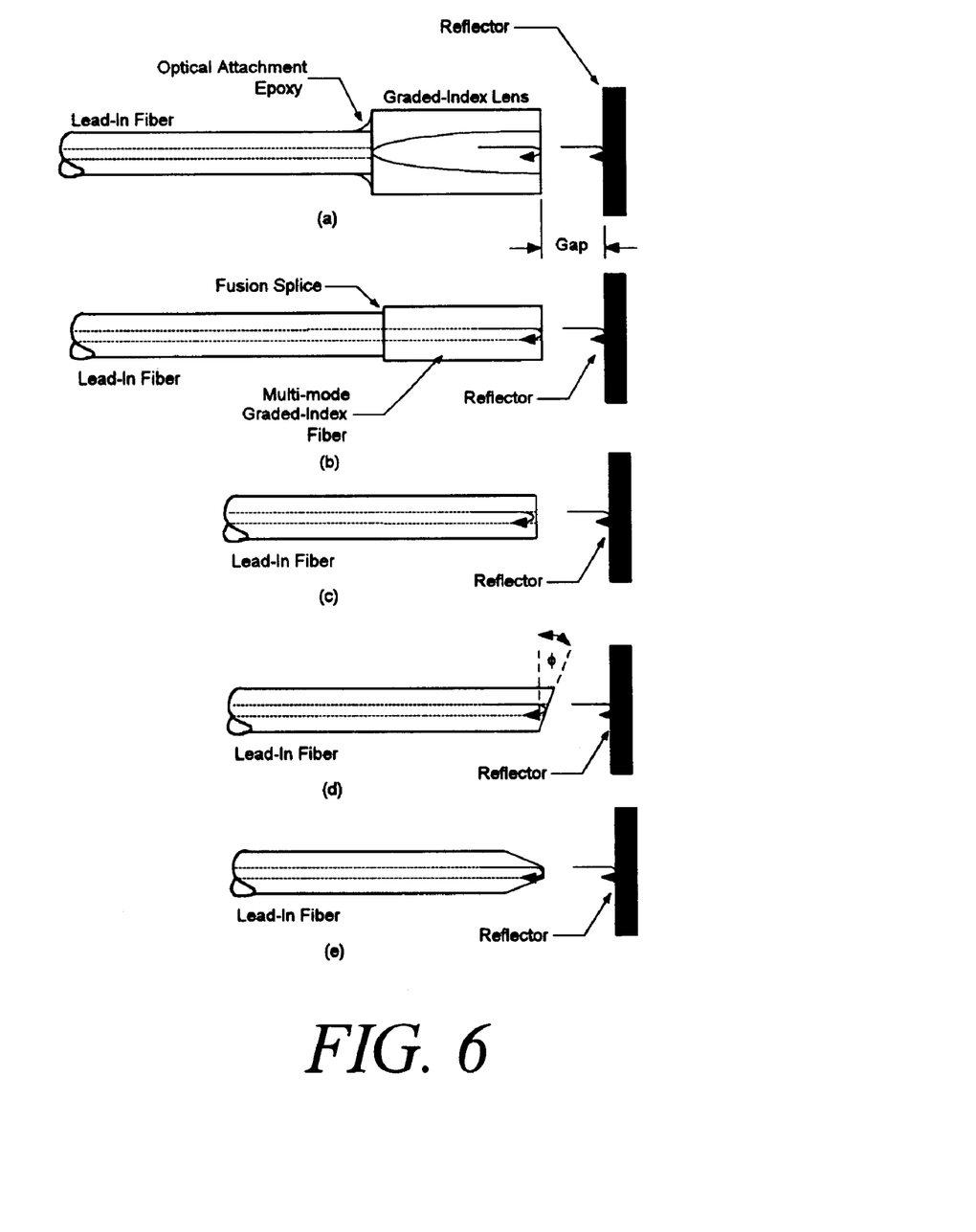

A Novel Fiber Optic Sensor Technology, and the Associated Electro-Optic Subsystems which Utilizes a State-of-the-Art Signal-Processing Algorithm Interferometric Sensor Principle of Operation Shown in FIG. 6 are five examples of sensor configurations (not to be considered inclusive of all possible configurations) that can be used to monitor displacement using the disclosed electro-optic configuration and algorithm. Each example given utilizes the sensor (fiber) end face/gap interface to generate a first surface reflection. With each configuration shown, two sensing schemes are available. The first scheme is a fixed fiber/mobile reflector methodology and the second is a mobile fiber/fixed reflector methodology. With respect to dilatometry, a fixed fiber/mobile reflector scheme is employed.

The first configuration shown in FIG. 6 (a) places a graded-index (GRIN) lens at the end of a fiber. This configuration has the advantage of being able to collimate the light beam to enable longer-distance measurements (larger strains). Configuration (b) allows for a decrease in the cross-sectional sensor profile of configuration (a) through the implementation of a spliced multi-mode graded-index fiber. Note that with this configuration the length of the multi-mode fiber is not arbitrary. Configuration (c) further reduces the cross-sectional sensor profile. Configuration (d) represents the configuration implemented within this disclosure. A standard single-mode fiber is cleaved and/or polished at an angle φ, which has been shown to improve the signal to noise ratio. Finally, configuration (e) represents an alternative approach.

In all five configurations the operation is the same: light energy enters from the left in the lead-in fiber and ca. 4% is reflected at the glass/gap interface (the is termed the Fresnel reflection). The remaining energy is coupled into the gap region, where it traverses the gap and is reflected by a reflector. After traveling back to the fiber interface some of the reflected energy is coupled back into the fiber, where it modulates the Fresnel reflection. If the reflecting modulation is in phase with the Fresnel wave the two constructively interfere, else if they are out of phase they destructively interfere. The first surface reflection can be strengthened or weakened through the use of specific coatings (see FIG. 8).

Figure 7:
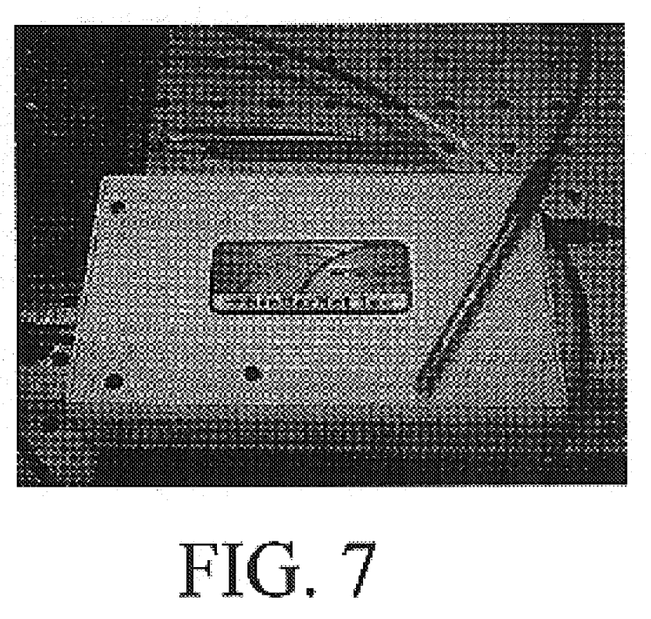

FIG. 7 shows one configuration of the disclosed sensor technology. The probe shown replaces the LVDT in traditional dilatometry and removes the need for the push rod and plug shown in FIG. 4. The sensor uses the mercury surface as the reflector shown in FIG. 6 or one can employ a floating mirror that rides on the surface without the need for a counterbalance system.

Figure 8:
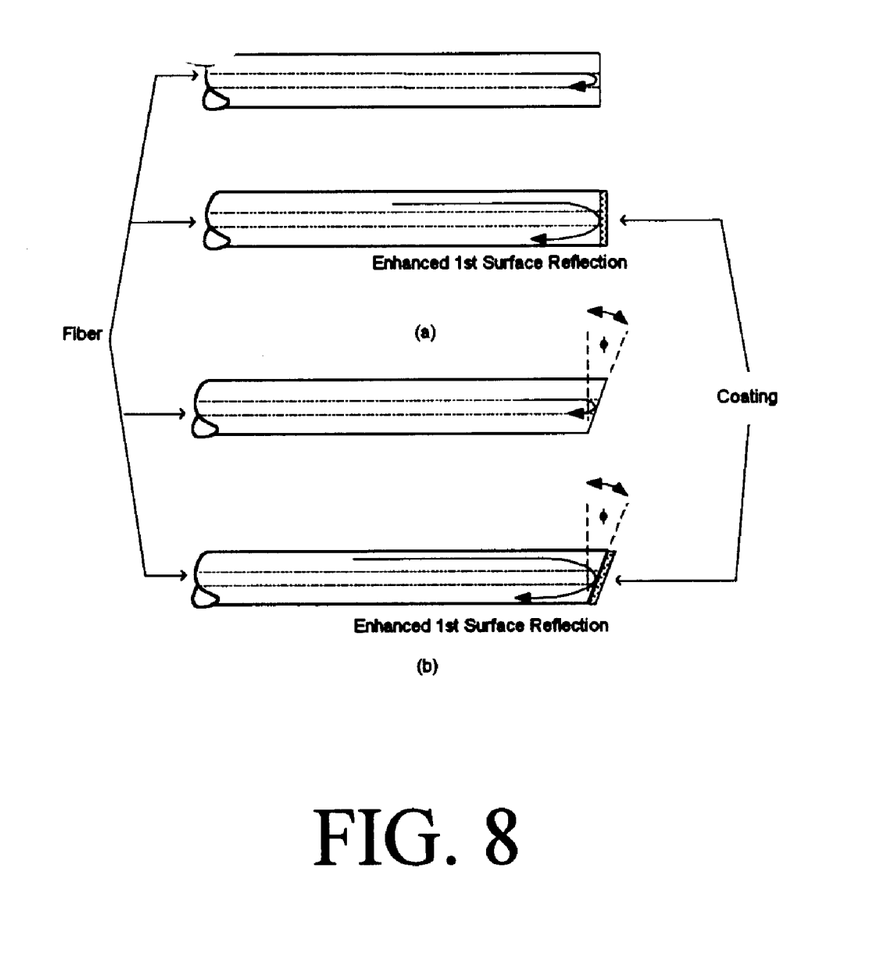

FIG. 8 illustrates how, through the application of specific coatings, the ca. 4% reflection at the glass/gap interface (first surface reflection) can be increased.

Sensor Fabrication

Fringe visibility, or the absolute height difference between the maximum and minimum peaks in the interferogram, is an important parameter that directly impacts system accuracy. In order to maximize fringe visibility, hence, increase signal to noise ratio, several options are available: 1) the use of GRIN lenses, 2) the use of a short piece of graded index fiber fusion spliced at the sensor tip, or 3) the use of polishing to increase the reflectance of the two surfaces. Additionally, recent calculations indicate that a slight angle, induced at the fiber end-face, can contribute to a slight increase in fringe visibility (see FIG. 6).

Optical System Configuration

For this disclosure the configuration of the optical subsystems is as follows. A light emitting diode with a center wavelength of 850 nm and 20 nm full width half-maximum serves as the light source and a StellarNet, Inc. EPP2000 spectrometer serves to digitize the broadband interferometric signal. The spectrometer possesses a 2048 pixel array and a wavelength range of 550–1000 nm. Interface to the computer is through an EPP parallel port. There are many optical system configurations possible and configuration examples addressed are not meant to limit in any manner the number of realizable configurations. The novel aspects of the system are 1) the use of a spectrometer, 2) the sensor configurations and 3) the signal processing algorithm.

In order to validate the statement aforementioned concerning the number of available optical configuration for measuring displacements with high accuracy over a given dynamic range (i.e. specific to the application of interest), computer simulations are given below. The simulations rely on white-light interference patterns with known parameters [displacement gap and signal-to-noise ratio (SNR)]. The variables of interest are the mean and standard error of the source profile, 2) the number of pixels in the spectrometer, and 3) the wavelength range of the spectrometer.

FIGS. 9 through 12 depict the results of the computer simulations for two different optical configurations. The mean error (bias error) represents the accuracy of the measurement and can be reduced through proper calibration. The random error (variance) represents the resolution of the system and cannot be reduced through calibration15.

FIG. 9 and FIG. 10 are representative of configuration one. This configuration employs a SLED (super-luminescent light emitting diode) centered at 850 nm with a 50 nm full-width half-max and a spectrometer with a wavelength range of 750–950 nm. Typically, the SNR realized for the disclosed system was between 30 and 40 dB, therefore the mean error was less than 0.5 nm and the resolution was less than a nanometer.

FIG. 11 and FIG. 12 are representative of configuration two. This configuration employs a broadband white-light source and uses StellarNet's EPP2000c spectrometer which has a wavelength range of 200–850 nm. This results in a system accuracy increase of approximately two orders of magnitude.

These computer simulations indicate how the system accuracy, range and resolution are affected by changing the optical parameters. Using this information, the optical system can be tailored to meet specific requirements in range or accuracy.

Although several options exist for the design and construction of the integrated opto-electronics, common to all systems are the LED light source, the LED driver & optical coupler subsystem, the sensors, at least one spectrometer, some form of analog to digital conversion subsystem, a control and feedback subsystem, a digital to analog conversion subsystem, and the signal processing algorithm to process the signal.

Detailed Description of the Fiber-Optic Displacement Sensor

Figure 13:
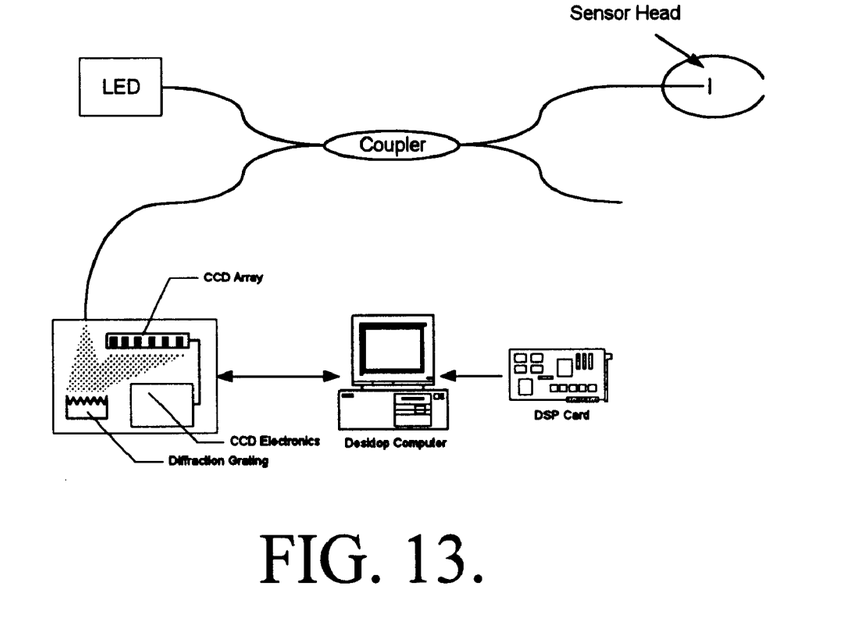

The fiber optic displacement sensor is based on white-light interferometry. FIG. 13 shows the basic functional block diagram of a wavelength encoded optical fiber sensor system. A visible light-emitting diode (LED) is employed as the energy source to launch light into a single-mode optical fiber. The broadband light propagates to the sensor through an optical coupler, and reflects back, first, from the glass-air interface of the input/output fiber, and second, from the interface of the reflector.

The first reflection is termed as the reference reflection while the second reflection is termed as the sensing reflection. A reflection of desired percentage can be achieved from the 2nd interface by applying appropriate thin film coatings to the reflector surface. Interference occurs between the backward propagating waves of the reference and sensing reflections[16].

The reflected light propagates back to the end of a fiber through the optical coupler and is incident on a diffraction grating, which separates the light components by diffracting different wavelengths at different angles on to a CCD array.

The CCD array integrates the intensity of different wavelength components of the light at different elements of the array which results in an electrical signal pattern with discrete amplitude pulses which are a function of 1) the linear fringe pattern of the interfering waves, 2) the sensor air gap, 3) the profile of the light launched from the LED, 4) the responsivity profile of the CCD photo-diodes, and 5) the optical characteristics of the fiber/coupler system. The discrete analog pulses output by the CCD array are digitized and transferred to a digital signal processing (DSP) unit, which does all the necessary processing of the digital signal, in real-time, to determine the gap length of the sensor.

The sensor system shown in FIG. 13 can measure gap length between an input/output fiber and a reflector spacing, and hence the movement (magnitude and direction) of the reflector movement, with respect to the input/output fiber. This is unlike single frequency phase measurement interferometry, where the absolute position of the reflector with respect to the reference is never known and displacement in excess of $\lambda/4$ ($\lambda$ being the wavelength of the light in free space) becomes ambiguous.

Figure 14:
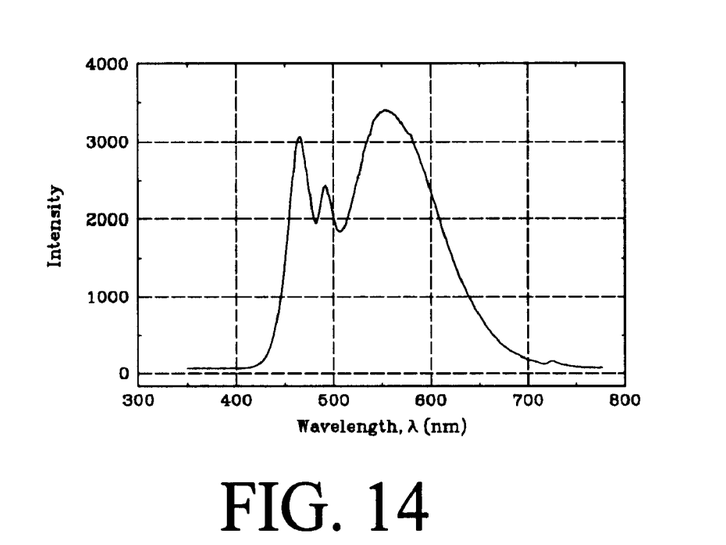

FIG. 14 shows white light spectrum produced from a new line of sources available only on a R&D basis from Hewlett-Packard. The advantage of these sources is the cost is nearly 2 orders of magnitude less than conventional white-light or broadband sources. The disadvantage of these sources is that the light is not as intense when coupled into optical fiber as other sources.

Light Sources

Computer simulations show that to achieve highest sensitivity, the sources and spectrometer should operate at lower wavelengths. There are limited semiconductor devices below 600 nm wavelength; however, Hewlett-Packard has just released a new white-light LED for R&D evaluation purposes that shows great promise. See FIG. 12. Other, non-semiconductor based light sources include tungsten krypton bulbs, which have a wavelength range 350–1600 nm and a deuterium lamps, which extend down to 200 nm.

The System Signal Response and Algorithm

Figure 15:
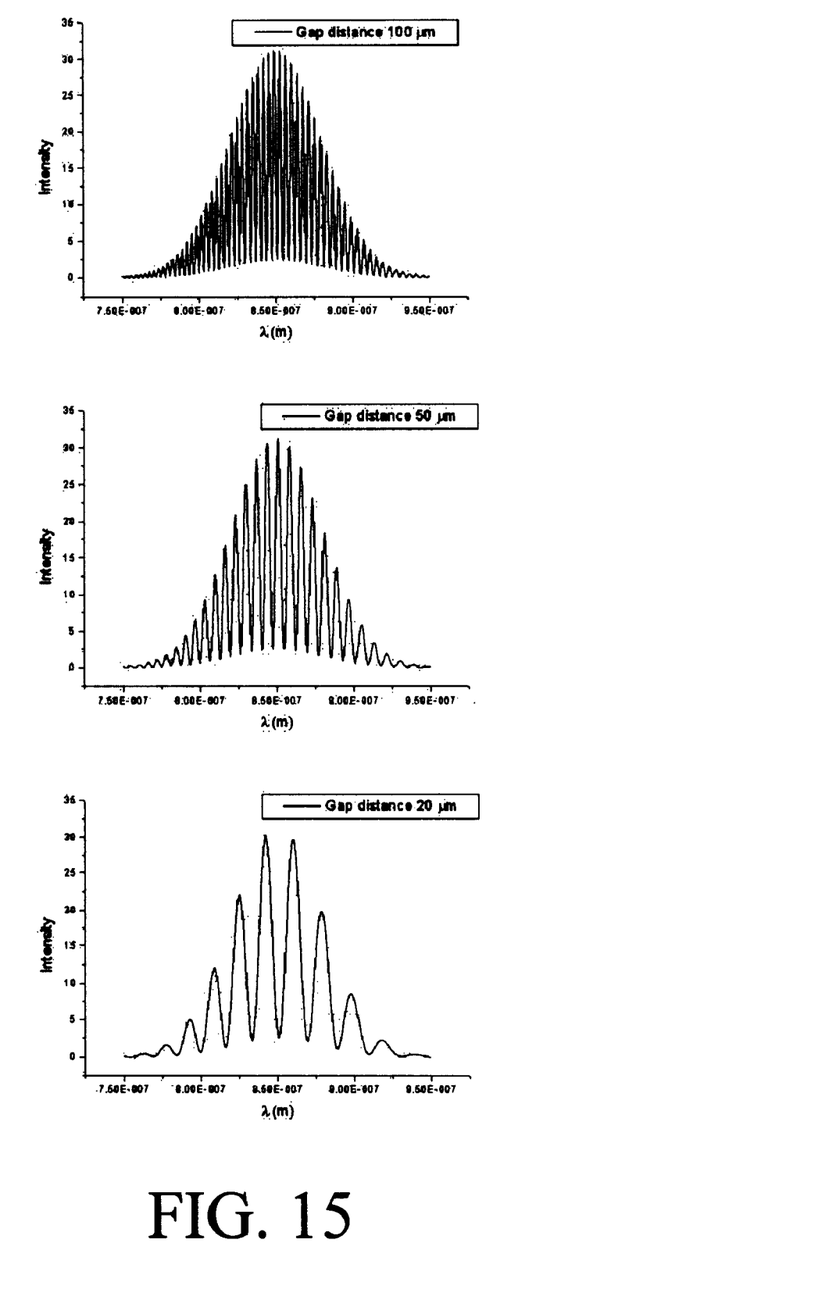

FIG. 15 shows the signal response of the wavelength modulated sensor system for an air gap of 11, 50, and 20 $\mu$m. Due to the approximate Gaussian profile of the LED optical source, the signal response is a Gaussian amplitude modulated fringe pattern. As the length of the air gap increases, the number of wavelengths which can satisfy the condition of in-phase addition, after being reflected from the reference interface and the sensing interface, also increases, increasing the number of fringe peaks, and decreasing the distance (in terms of wavelength) between adjacent fringe peaks. Note that the frequency of occurrence of fringe peaks decreases gradually towards the higher end of wavelength values, i.e., there is a chirp present in the frequency of the fringe pattern. This chirp is due to the fact that the condition of in-phase addition, after being reflected from the reference interface and the sensing interface, is met more frequently (in terms of wavelength distances) at lower wavelengths, and gradually decreases with increasing wavelengths. To achieve higher accuracy, the phase information from the spectral signal can be recovered. This is accomplished be taking the Fourier transform of the spectral signal S(v):

$$G(\delta) = \int S(v) e^{-i2\pi v\delta/c} d\delta \quad (1)$$

The function $G(\delta)$ consists of a zero harmonic corresponding to the spectral distribution of the source and a couple of first harmonics corresponding to the fringe pattern. The phase information is contained in the first harmonics. A Fourier transform is taken of $g(\delta)$ which is $G(\delta)$ with the zero harmonic subtracted out:

$$f(v) = 2 \int g(\delta) e^{i2\pi v\delta/c} dv \quad (2)$$

The complex function f(v) gives the proper relation between phase $\phi$ and light frequency $v$. The sensor gap is determined from the derivative of $\delta\phi/\delta v$:

$$g = \left(\frac{\partial \varphi}{\partial v}\right)\frac{c}{4\pi} \quad (3)$$

Given this, and after some manipulation, the maximum gap that can be processed with the algorithm is given:

$$g_{max} = \frac{Nc}{4(v_1 - v_N)} \quad (4)$$

where N is the number of pixels, c is the speed of light in a vacuum, $v_1$ is the frequency of light at pixel 1, and $v_N$ is the frequency of light at last pixel. Hence, for a spectrometer with 2048 pixels and scan of 750 to 950 nm, the theoretical maximum detectable gap is 1.8 mm. In reality, due to electronic noise, the gap will probably be less, due to signal to noise considerations within the detection opto-electronic subsystems. Additionally, although from a user-viewpoint this is an irrelevant specification, from the designer's viewpoint this is a very important specification, for it indicates how far the reflector can be from the fiber end-face.

Novel Sealed Cell Design

The following features contribute to the novelty of the cell design:

The cell design incorporates a scalable dynamic range through the use of internal sleeves (i.e. the instrument sensitivity is scalable), The cell design allows for auto-positioning of the sensor element to allow for compensation of the mercury coefficient of thermal, The cell can be pressurized, The cell is reusable, thus a-priori calibration leads to an increase in sensitivity of the disclosed device, The cell inner environment is isolated from the external environment to reduce the environmental concerns associated with mercury toxicity, The cell allows for the measurement of liquid and solid thermodynamic parameters, The cell utilizes the mercury surface as a reflector for the sensing reflection, and The cell can double as a linear dilatometer.

Note that item the sixth item above is not to be construed as the only configuration available to the cell, although it is a unique attribute. For example, a floating mirror can be placed on the mercury surface to act as a reflector if required or in the case of linear dilatometry, the solid or liquid surface can act as a reflector or support a reflector.

Figure 16:
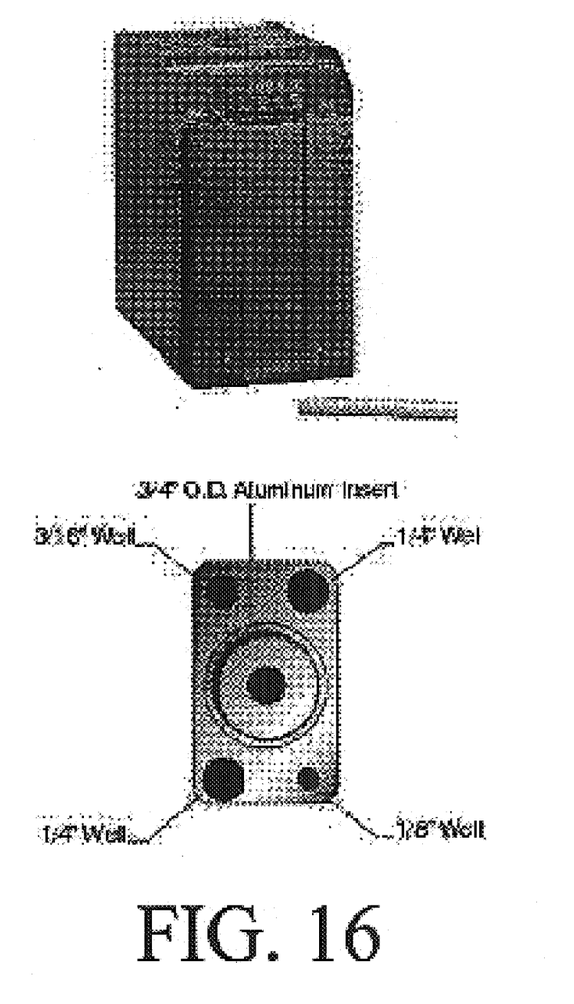

FIG. 16 shows a photo of the dry block, the dilatometer cell and a diagram of the dry well. A vertical tube furnace, such as those found in drywell technologies, can be used. The ¾"O.D. Aluminum insert which is standard with the COTS device is replaced by the dilatometer cell.

Figure 17:
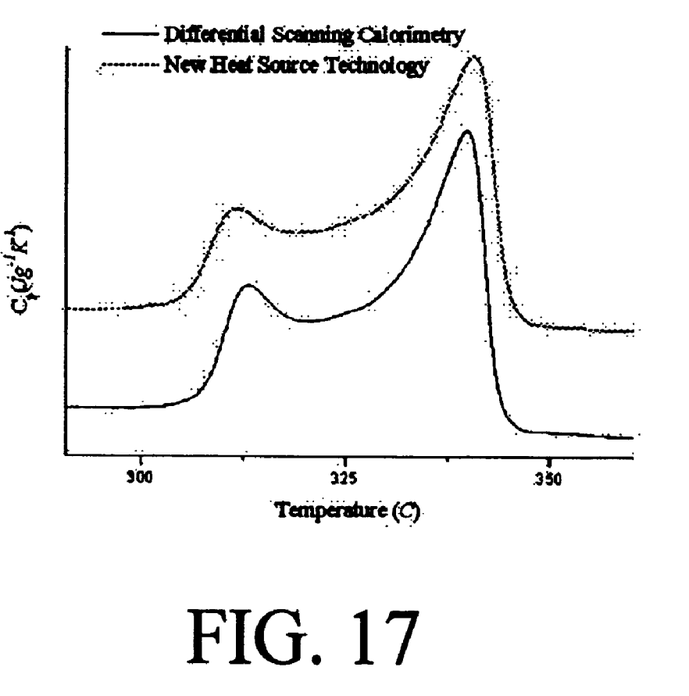

FIG. 17 depicts data which supports the use of dry block technology for the disclosed application through melt transition analysis using differential scanning calorimetry (DSC). The result shows unequivocally that the thermal histories of the two samples above, one which was thermally treated by the disclosed device and one which was thermally treated within the DSC, are identical to with the experimental uncertainties of the DSC. The traces have been vertically shifted for clarity.

While the invention has been particularly shown and described with reference to a preferred embodiment thereof, it will be understood by those skilled in the art that various changes in form and details may be made therein without departing from the spirit and scope of the invention. For example, The disclosed, commercially viable, miniature, high accuracy, displacement sensor is not only applicable to volumetric dilatometry but also conventional linear dilatometry. Further, the applicability of the sensor technology to other instrumental applications is also noted (i.e. dynamic mechanical analysis, thin film analysis and/or any application which requires the accurate measurement dimensional change as a function of a stimuli which could be electric, magnetic, thermal, chemical, and/or physical in nature).

The embodiments of the invention in which an exclusive property or privilege is claimed are defined as follows:

1. A volumetric dilatometer comprising:
    a volumetric dilatometer sample cell;
    an optical displacement sensor configured to measure displacement of said sample cell;
    a furnace means for heating said sample cell; and
    means for using a gap measurement obtained from said displacement sensor in an application which requires the measurement of at least one of absolute distance and displacement.

2. The volumetric dilatometer in accordance with claim 1, wherein said furnace means comprises a vertical tube furnace.

3. The volumetric dilatometer in accordance with claim 1, wherein said sample cell comprises a sealed cell.

4. The volumetric dilatometer in accordance with claim 1, further comprising a mercury reservoir capable of receiving and locking with said sample cell.

5. The volumetric dilatometer in accordance with claim 4, wherein said sample cell is locked onto the bottom of said mercury reservoir.

6. The volumetric dilatometer in accordance with claim 4, further comprising an outer reservoir sleeve for sensor-to-cell alignment during sensor positioning.

7. The volumetric dilatometer in accordance with claim 1, further comprising an outer reservoir sleeve for sensor-to-cell alignment during sensor positioning.

8. The volumetric dilatometer in accordance with claim 1, further comprising a micro-translation stage for automated positioning of the optical sensor.

9. The volumetric dilatometer in accordance with claim 8, wherein said micro-translation stage is capable of automated re-leveling in an out-of-range condition.

10. A novel signal-processing algorithm for volumetric dilatometry, comprising:
    recovering phase information from a spectral signal received by a volumetric dilatometer by taking a Fourier transform of the spectral signal; and
    deriving a sensor gap measurement form said phase information.

* * * * *